US 6,575,596 B2

(12) United States Patent
Butt

(10) Patent No.: US 6,575,596 B2
(45) Date of Patent: Jun. 10, 2003

(54) COMBINATION STYLUS AND LASER POINTER

(75) Inventor: Aamir M. Butt, Troy, MI (US)

(73) Assignee: ComCon, Inc., Troy, MI (US)

( * ) Notice: Subject to any disclaimer, the term of this patent is extended or adjusted under 35 U.S.C. 154(b) by 0 days.

(21) Appl. No.: 09/747,562

(22) Filed: Dec. 22, 2000

(65) Prior Publication Data

US 2002/0080610 A1 Jun. 27, 2002

(51) Int. Cl.[7] ............................................. F21K 27/00
(52) U.S. Cl. ......................... 362/259; 362/118; 362/109
(58) Field of Search .............................. 362/259, 118, 362/109, 97, 98

(56) References Cited

U.S. PATENT DOCUMENTS

| | | |
|---|---|---|
| 2,811,632 A | 10/1957 | Bartlett |
| 2,979,602 A | 4/1961 | Barnett |
| 3,963,914 A | 6/1976 | Browning et al. |
| 5,193,897 A | 3/1993 | Halsey |
| 5,307,253 A | 4/1994 | Jehn |
| 5,335,150 A | 8/1994 | Huang |
| 5,343,376 A | 8/1994 | Huang |
| 5,617,304 A | 4/1997 | Huang |
| 5,697,700 A | 12/1997 | Huang |
| 5,747,748 A | 5/1998 | Zigler |
| 5,882,106 A | 3/1999 | Galli |
| 5,913,629 A | 6/1999 | Hazzard |
| 5,988,832 A | 11/1999 | Chen |
| 5,993,026 A | 11/1999 | Wu |
| 6,012,823 A | 1/2000 | Shiao |
| 6,231,204 B1 * | 5/2001 | Lo .............................. 362/118 |

* cited by examiner

Primary Examiner—Sandra O'Shea
Assistant Examiner—Ronald E. DelGizzi
(74) Attorney, Agent, or Firm—Warn, Burgess & Hoffmann, P.C.

(57) ABSTRACT

A combination stylus and laser pointer for use in connection with a personal digital assistant (PDA), the combination having a thin slimline housing enabling the apparatus to be stored in a groove or channel located on the PDA. A laser module assembly for generating a laser beam is secured within the housing on one end thereof. The device further includes an interchangeable stylus and pen tip that is secured within the housing at the opposite end thereof.

6 Claims, 6 Drawing Sheets

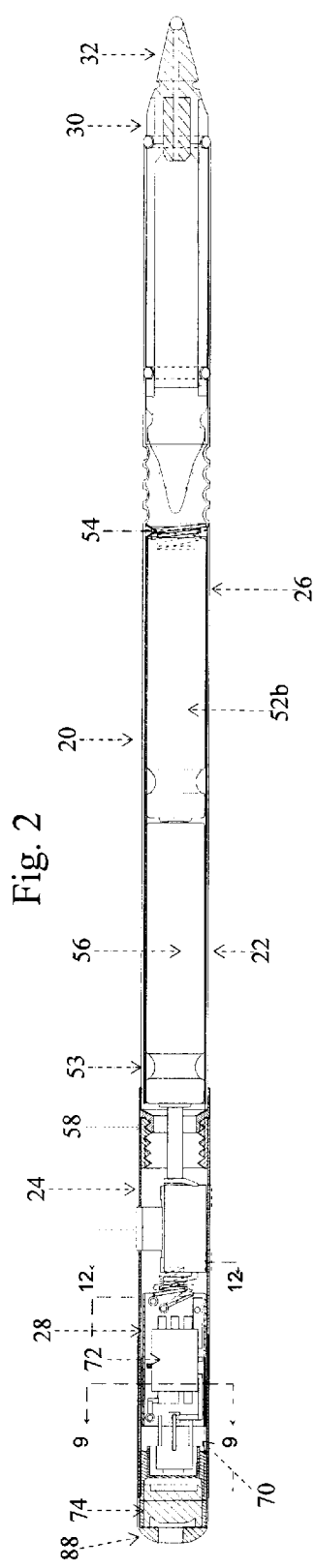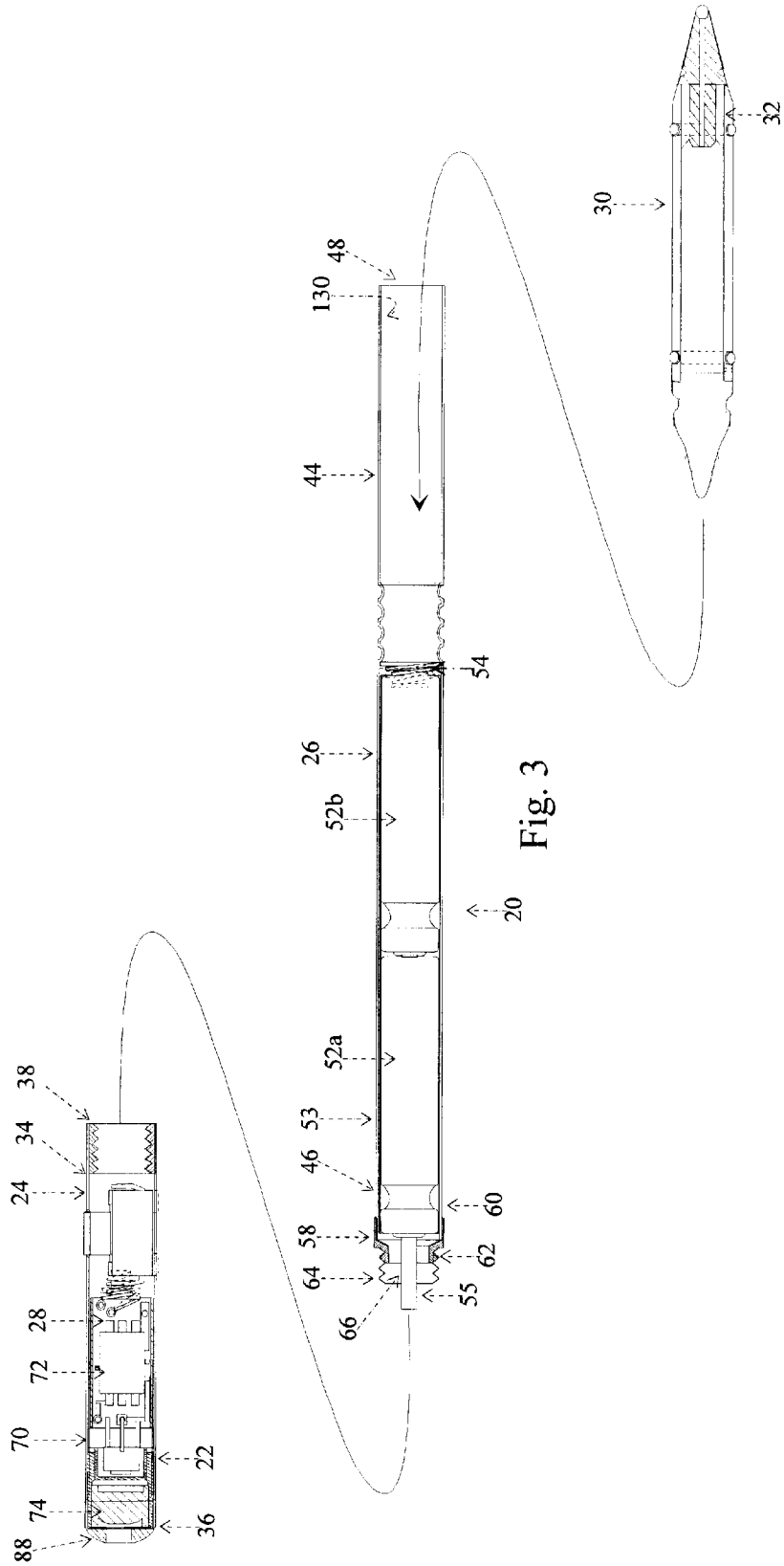
Fig. 2
Fig. 3

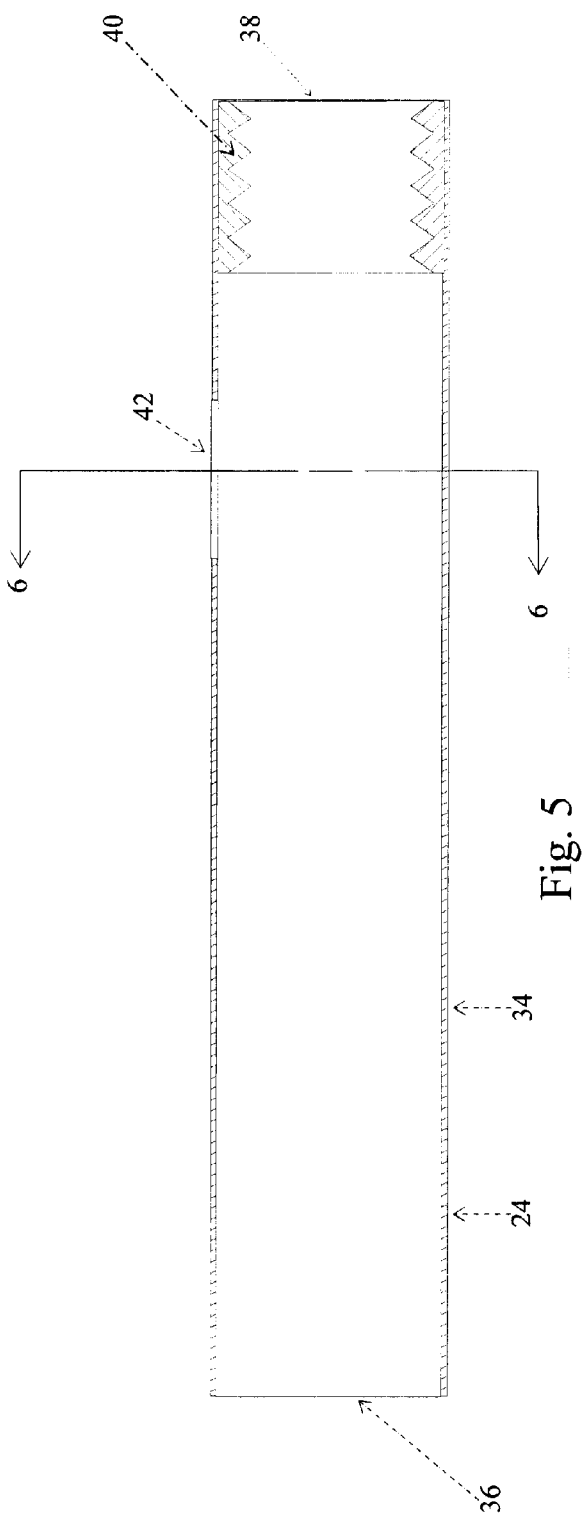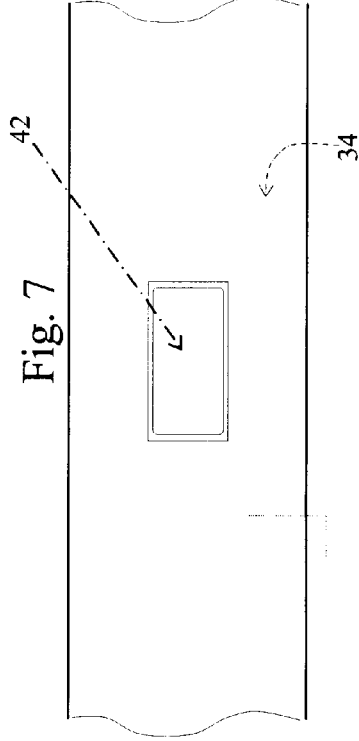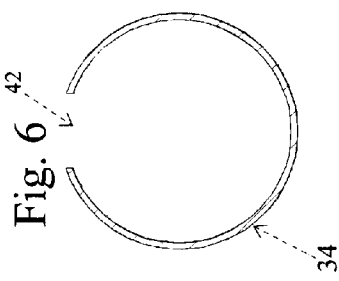

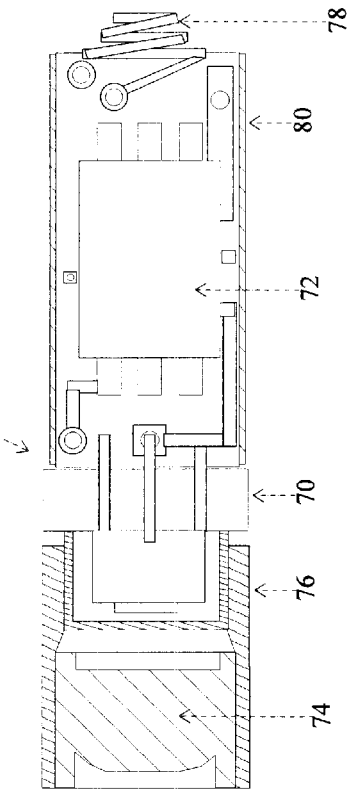
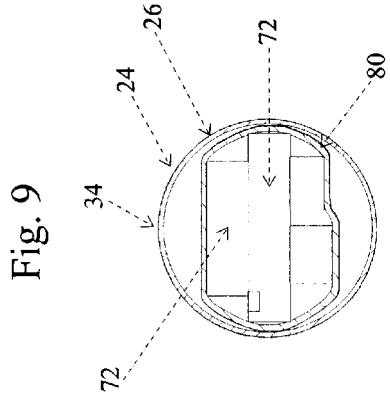
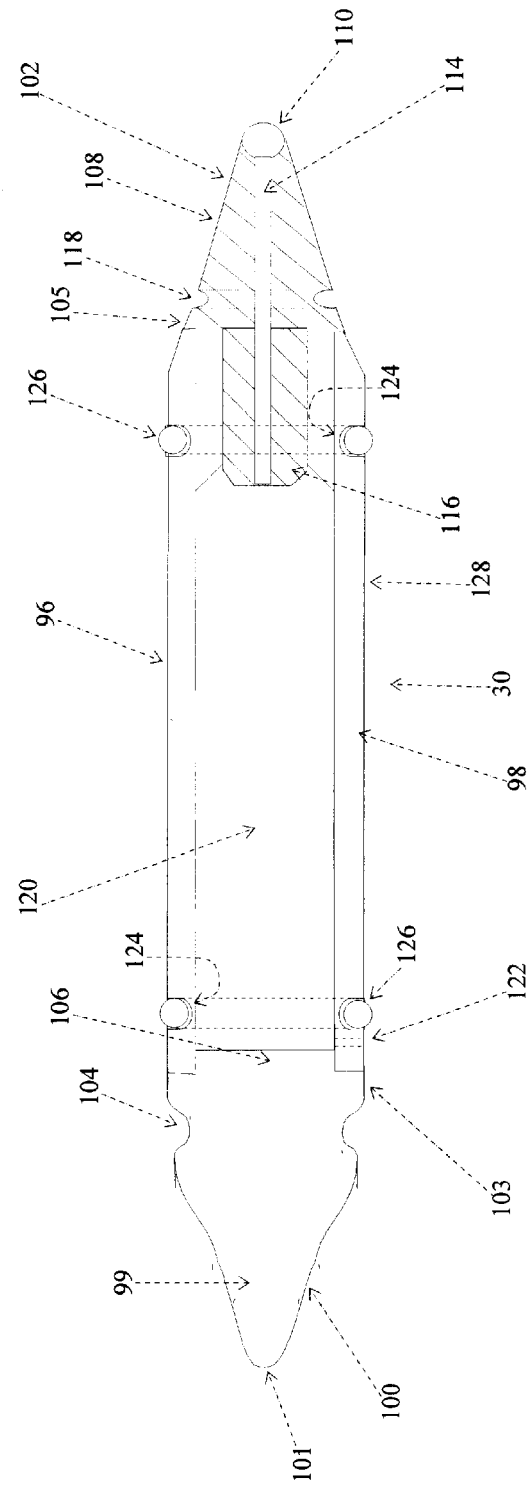

COMBINATION STYLUS AND LASER POINTER

BACKGROUND OF THE INVENTION

1. Field of the Invention

The present invention relates generally to a combination of a stylus and a laser pointer and more specifically, to a slimline stylus and laser pointer combination for use with a personal digital assistant (PDA).

2. Description of the Related Art

Today's businessperson typically carries a multitude of electronic equipment and other tools as part of their day to day business operations. For instance, among other things, an individual may carry a cellular telephone, a personal digital assistant (PDA), including a special stylus used to enter information into the PDA, a lap top computer, a laser pointer for use in giving presentations, and various writing utensils such as pens and pencils.

A PDA is an electronic organizer having a touch-sensitive LCD screen, wherein information input is typically accomplished by a special stylus used to write on the screen. The stylus is designed to be compatible with the touch-sensitive screen to prevent damage to the touch-sensitive screen. Use of a special stylus typically requires that the stylus be kept or stored with the PDA, normally in a channel or groove on the PDA. To input information, the stylus is removed from the storage channel or groove and used to write on the touch-sensitive LCD screen to input information into the PDA.

Once the necessary information is input into the PDA, the stylus is replaced in the channel or groove.

Laser pointers are commonly used to emit a laser beam to point out or draw attention to a particular item or thing on a display, a map, a chart, etc. Such devices typically incorporate a laser diode and a trigger circuitry used to activate the diode to generate a laser beam.

Keeping track of all these devices becomes a substantial chore in and of itself, and all too often an item is lost. Accordingly, various combinations have been proposed and are known in the prior art. Specifically, combined pen and laser pointer apparatuses and writing implements having a stylus tip, either adjacent the pen or the implement tip or on the opposite end thereof, are known. While these designs are effective for their intended use, there is nevertheless a need for a combined instrument that includes a stylus and a laser pointer that is easily stored in the storage channel or groove located on the PDA.

SUMMARY OF THE INVENTION

Accordingly, the present invention provides a slimline stylus and laser pointer combination. The stylus and laser pointer combination includes a thin, elongated hollow housing. A laser module assembly is secured within one end of the hollow housing and a stylus module assembly is secured in the opposite end thereof. A power source, typically a battery, is contained within the elongated hollow housing along with a switch that upon actuation enables power to flow to the laser module assembly to energize a laser diode and generate laser light.

An additional feature of the present invention is the reversibility or interchangeability of the stylus module assembly. Specifically, the stylus module assembly includes a tubular member having a pen tip on one end thereof and a stylus tip on the opposite end. The stylus module assembly pen is removed from the elongated hollow housing to switch between the stylus tip and the pen tip.

Finally, the slimline configuration enables the stylus and laser pointer combination of the present invention to be used or stored in a groove or storage channel located on the PDA.

Other features and advantages of the present invention will be readily appreciated as the same becomes better understood after reading the subsequent description taken in conjunction with the accompanying drawings.

BRIEF DESCRIPTION OF THE DRAWINGS

FIG. 2 is a side, sectional view of a slimline stylus and laser pointer combination according to a preferred embodiment of the present invention;

FIG. 3 is an exploded, side, sectional view of the slimline stylus and laser pointer combination shown in FIG. 2;

FIG. 5 is a side, sectional view of the laser housing section of the slimline stylus and laser pointer combination shown in FIG. 2;

FIG. 6 is a cross-sectional view of the laser housing section of FIG. 5 taken along lines 6—6;

FIG. 7 is a top view of a portion of the laser housing section of FIG. 5;

FIG. 8 is a side, cross-sectional view of the laser module assembly of the slimline stylus and laser pointer combination shown in FIG. 2;

FIG. 9 is a cross-sectional view of the laser module assembly of FIG. 2 taken along lines 9—9;

FIG. 10 is a side, cross-sectional view of the stylus module assembly of the slimline stylus and laser pointer combination shown in FIG. 2;

DETAILED DESCRIPTION OF THE PREFERRED EMBODIMENT(S)

Figure 1:
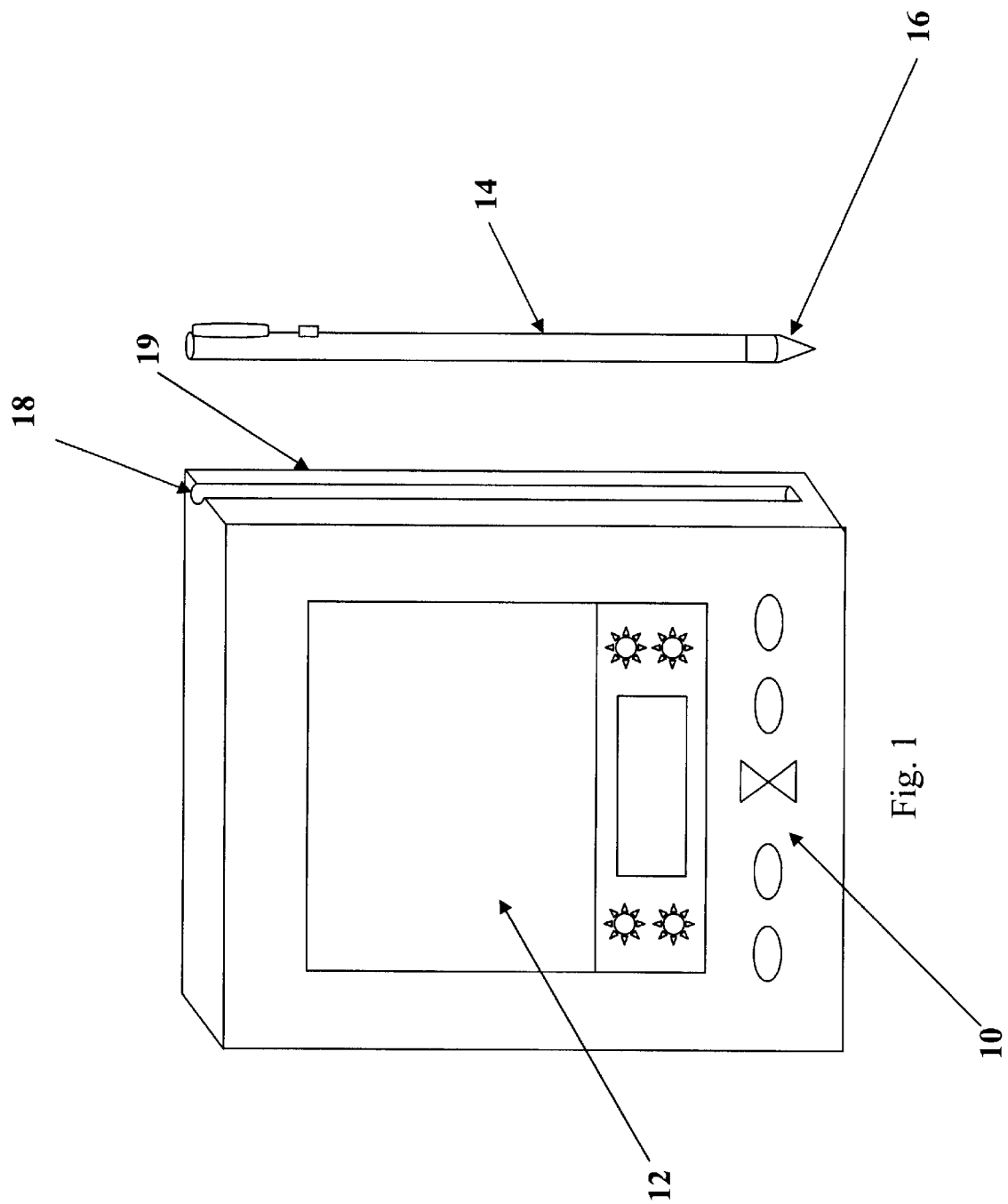
FIG. 1 is a perspective view of a personal digital assistant with which a slimline stylus and laser pointer combination according to the present invention may be used.

Referring now to FIG. 1, a personal digital assistant (PDA) 10 of the type with which the present invention may be used is shown. It follows that the present invention may be used with various types of electronic organizers, other than the specific style shown herein. Due to the nature of the touch-sensitive screen surface 12, it is necessary to use a special stylus 14; typically a writing implement with a blunt plastic end or point 16, to enter information. Standard writing implements such as ball point pens or pencils are not suitable for use with PDAs as they tend to mar or scratch the touch-sensitive screen surface 12 and impair clear input of information. Because a special stylus 14 is used, a groove or channel 18 is normally located on one side 19 of the PDA 10 to store the stylus 14 when not in use and to make the stylus 14 available when needed.

Turning now to FIGS. 2–3, a stylus and laser pointer combination 20 according to the present invention is shown.

The stylus and laser pointer combination 20 is sized such that it fits and is stored in the existing groove or channel 18 located on the PDA 10. Such a combination provides the user of the PDA 10 with both a stylus to input information into the PDA 10 and a laser pointer for use in drawing attention to or pointing out specific items. The stylus and laser pointer combination 20 includes an elongated body 22 having a laser housing section 24 and a battery housing section 26. A laser module assembly 28 is supported within the laser housing section 24 and a stylus module assembly 30 is supported within the battery housing section 26. As set forth more fully below, a pen assembly 32 may form part of the stylus module assembly 30.

Figure 4:
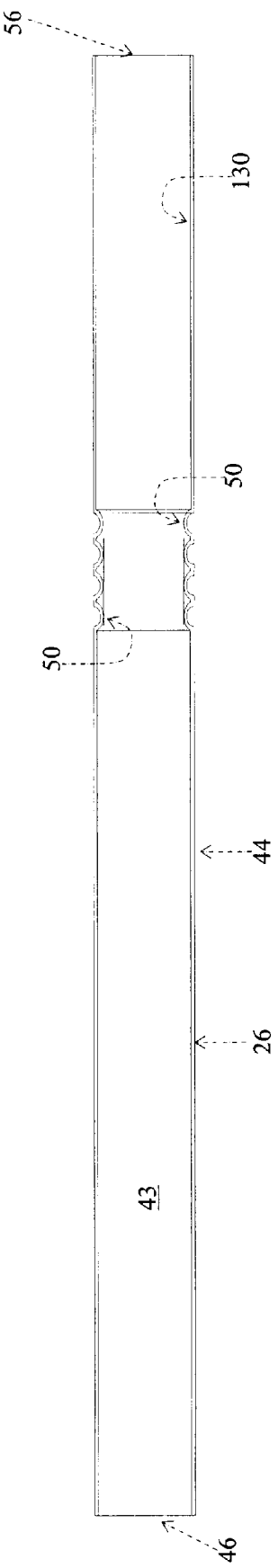
FIG. 4 is a side, sectional view of the battery housing section of the slimline stylus and laser pointer combination shown in FIG. 2.

As shown in FIGS. 5–7, the laser housing section 24 is an elongated cylindrical shaped hollow tube 34 having a first end 36 and a second end 38. The second end 38 has a plurality of internal threads 40 located therein. The elongated cylindrical shaped tube 34 further includes a rectangular opening 42. As shown in FIG. 4, the battery housing section 26 is also an elongated cylindrical shaped hollow tube 44 having a first end 46 and a second end 48. The battery housing section 26 further includes a series of annular indentations 50 located in the elongated cylindrical shaped tube 44. As set forth further below, the annular indentations 50 extend inwardly into the interior 43 of the elongated cylindrical shaped tube 44.

The battery housing section 26 receives a pair of batteries 52a, 52b that provide power to the laser module assembly 28. As shown in FIG. 3, the batteries 52a, 52b are inserted within the elongated cylindrical shaped tube 44 of the battery housing 26 and are supported on one end by a battery stop 54. The battery stop 54 is a contact spring inserted into the elongated cylindrical shaped tube 44 and seated on one of the annular indentations 50. The contact spring 56 engages the negative terminal of the second battery 52b. As shown in the figures, the second battery 52b is a stub battery, i.e., the positive terminal is a button terminal. The first battery 52a is a pin battery, i.e., the positive terminal is an elongated pin 55. Both batteries 52a, 52b are inserted into the battery housing section 26 with the negative terminal of the stub battery 52b engaging the contact spring 56.

It is also desirable to place the batteries 52a, 52b in a separate container or protective covering 53 prior to inserting the batteries 52a, 52b into the battery housing section 26. In the preferred embodiment, the covering 53 is made of a suitable heat shrink material that is used to protect and secure the batteries 52a, 52b. Prior to installation in the battery housing section 26, the batteries are placed in the covering 53 after which it is heated to cause the covering 53 to shrink or contract about the batteries 52a, 52b. The purpose of placing the batteries 52a, 52b in the covering 53 is to insulate and protect the batteries 52a, 52b after they are placed in the battery housing section 26.

A connector cap 58, including an annular collar 60 and a stepped down annular member 62 extending outward from the collar portion 60 attaches to the first end 46 of the battery housing section 26. A plurality of threads 64 are disposed on the stepped down annular member 62 of the cap 58. A passageway 66 extends through the cap 58. The pin 55 on the pin battery 52a extends through the passageway 66 to connect the power source or batteries 52a, 52b to the laser module assembly 28. As shown in FIG. 3, the annular collar 60 of the cap 58 extends over the first end 46 of the elongated cylindrical shaped tube 44 of the battery housing section 26. Accordingly, the cap 58 holds the batteries 52 within the elongated cylindrical shaped tube 44. The connector cap 58 may be press fit onto, or otherwise secured to, the battery housing section 26.

Turning now to FIG. 8, the laser module assembly 28 is shown. The assembly includes a standard laser light source or laser diode 70 along with operating circuitry 72 connected to the laser diode 70 to control and operate the laser diode 70. The laser module 28 used herein is a standard 5 volt red laser module with a 635 nm–850 nm wavelength and a 5.6 mm diode. Due to the size, i.e., diameter, of the stylus and laser pointer combination 20, it is necessary to reduce the overall diameter of the laser diode 70 to a size that will fit within the elongated cylindrical tube 34 of the laser housing section 24. Currently, the diode 70 is turned down to a suitable diameter such that it fits in the laser housing section. It is also understood that a laser module 70 having a smaller diameter diode can be used depending upon commercial availability. The maximum outer diameter of a stylus that can be stored within the groove or channel 18 of the PDA 10 shown in FIG. 1 is 4.9 mm. It should be understood that various PDAs will have grooves or channels 18 of various sizes or diameters. The present invention is suitable for use with various PDAs. The only requirement is that the stylus and laser pointer combination 20 be of a size or diameter that will enable it to fit into the groove or channel 18 on the PDA 10. Accordingly, these size constraints require that the outer diameter of the laser diode 70 must be reduced to less than the internal diameter of the elongated cylindrical shaped tube 34 which, in the present embodiment, is 4.630 mm. As shown in FIGS. 8–9, a lens 74 is supported adjacent the laser diode 70 by a lens collar 76 attached to the laser diode 70. The lens 74 is positioned within the lens collar 76 for a point focus. A spring 78 is attached to the diode operating circuitry 72. The spring 78 is centered on the diode operating circuitry 72 and tapers inwardly as it extends outwardly therefrom such that it is centered and provides a negative contact which engages the pin 55 of the pin battery 52a. An insulator 80 surrounds the diode operating circuitry 72 to both insulate and protect the diode operating circuitry 72. The insulator 80 can be of a suitable type of heat shrink material commonly used to insulate wiring or electrical circuitry. The lens collar 76 is attached to the laser diode 70 at a positive polarity. The insulator 80 covers all of the diode operating circuitry 72 except for a portion of the lens collar 76.

In the preferred embodiment, the lens collar 76 is at a positive polarity, while the spring 78 has a negative polarity. When the laser module assembly 28 is placed within the laser housing section 24, the lens collar 76, which is at a positive polarity, connects or contacts with the laser housing section 24. As disclosed earlier, the contact spring 56 engages the battery housing section 26. Accordingly, when the laser housing section 24 connects to the battery housing section 26, the circuit is completed, provided, however, that the laser housing section 24 and battery housing section 26 are made of a conductive material, typically metal. This eliminates the need, and corresponding space required, for a return wire from the negative polarity contact spring 56 to the positive polarity lens collar 76.

Figure 12:
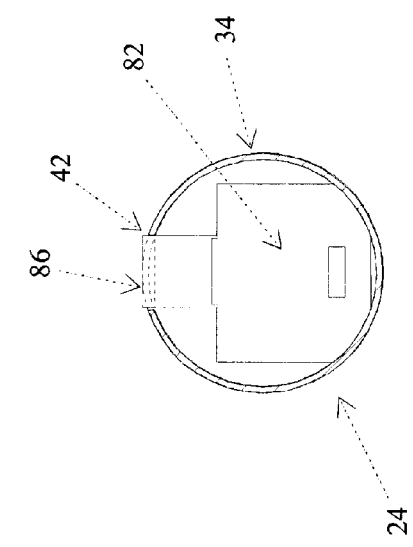
FIG. 12 is a cross-sectional view of the slimline stylus and laser pointer combination of FIG. 2 taken along lines 12—12.
Figure 11:
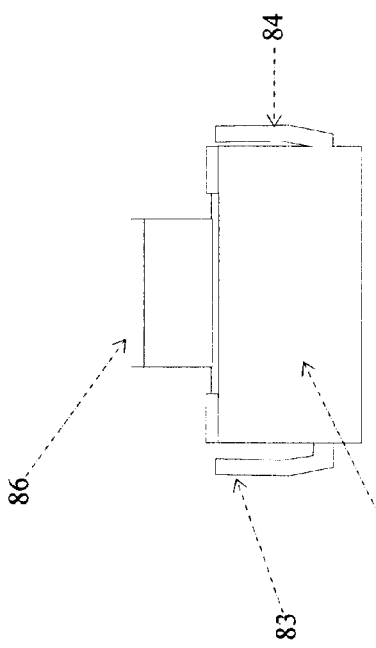
FIG. 11 is a side view of the switch of the slimline stylus and laser pointer combination shown in FIG. 2.
Figure 13:
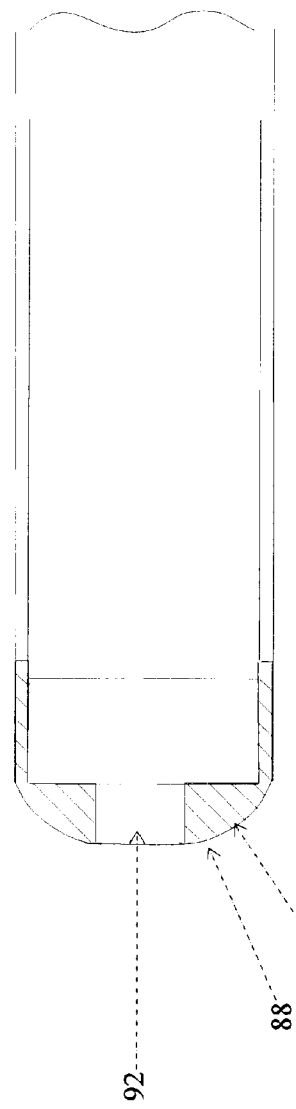
FIG. 13 is a side, cross-sectional view of the stylus cap of the slimline stylus and laser pointer combination shown in FIG. 2.

A shown in FIGS. 11–12, a switch 82, having first and second electrical contacts 83, 84 at each end thereof, is disposed within the laser housing section 24. The first contact 83 engages the spring 78 of the laser module assembly 28 and the second contact 84 engages the pin 55 of the pin battery 52a. The switch 82 includes a switch button 86 that when depressed, completes the electrical circuit allowing current to flow from the batteries 52a, 52b through the diode operating circuitry 72 to energize the laser diode 70. The switch button 86 extends outwardly through the rectangular opening 42 in the laser housing section 24. A stylus cap 88 (see FIG. 13) having a convex outer surface 90 and a passageway 92 is placed on the first end 36 of the laser housing section 24. Thus, the light generated from the laser diode 70 is focused and directed out through the passageway 92 in the stylus cap 88 by the lens 74 to project a concentrated beam of light on selected material to be displayed.

In the preferred embodiment, shown in FIG. 10, the stylus module assembly 30 includes an interchangeable stylus and pen combination 96 inserted into the second or open end 48 of the battery housing section 26. The stylus and pen combination 96 includes a tubular member 98 having a stylus tip 100 secured to one end thereof and a pen tip 102 secured to the opposite end. The stylus tip 100 having a conical body 99 that includes a rounded distal point or tip 101 and an opposing proximal end 103. The stylus tip 100 further including an annular groove 104 near the proximal end 103 of the stylus tip 100 connected to the tubular member 98. A post 106, extending from the proximal end 103 of the stylus tip 100, is inserted into the tubular member 98 to connect the stylus tip 100 to the tubular member 98. There are several ways to secure the stylus tip 100 to the tubular member 98, including a press or interference type fit or use of an adhesive. The rounded distal point or tip 101 is made of a material softer than the touch-sensitive screen surface 12 so that it will not scratch or otherwise damage the screen surface 12.

Secured to the opposite end of the tubular member 98 is a pen tip 102. As shown in FIG. 10, the pen tip 102 is a standard type ball point pen tip known in the art. The pen tip 102 includes a conical shaped body 108 having a ball 110 secured at the end or point 112 of the pen tip 102. A passageway 114 extends through the pen tip 102 to the ball 110 to provide a supply of ink, such that as the ball 110 rolls on a surface, the ball 110 deposits ink on the surface. The pen tip 102 also includes a post portion 116 used to connect the pen tip 102 to the tubular member 98. The pen tip 102 also includes an annular groove 118 near the end 105 of the pen tip 102 connected to the tubular member 98. As with the stylus tip 100, a press or interference type fit or use of an adhesive may also connect the pen tip 102 to the tubular member 98. It should be appreciated that the interior 120 of the tubular member 98 forms a reservoir that stores ink for use with the pen tip 102. To ensure ink flow, a vent hole 122 is placed in the tubular member 98 adjacent the stylus tip 100.

The stylus and pen combination 96 slidably fits within the second end 48 of the battery housing section 26. Circumferential grooves 124 are formed in the outer surface 128 of the tubular member 98. O-rings 126 are placed in the circumferential grooves 124. The O-rings 126 cooperate with the interior surface 130 of the elongated cylindrical shaped tube 44 to retain the stylus and pen combination 96 within the battery housing section 26. The annular grooves 104 and 118 in the respective stylus tip 100 and pen tip 102 provide a gripping surface for a user to grasp and pull the stylus and pen combination 96 out of the battery housing section 26 to change between the stylus tip 100 and the pen tip 102. Thus, in the present or illustrated embodiment, the stylus and laser pointer combination 20 has an interchangeable stylus and pen combination 96 held in one end thereof; i.e., the stylus and pen combination may be flipped from end to end for use as either a stylus or a pen. In the illustrated form, the invention provides a stylus and laser pointer combination 20 that is easily stored in the groove on the PDA 10. The combination 20 may also include an interchangeable stylus and pen combination to further provide advantages to the user.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

I claim:

1. A slimline stylus and laser pointer combination for use with a personal digital assistant, said slimline stylus and laser pointer combination stored within a groove or storage channel on the personal digital assistant comprising:

a housing including a thin, elongated hollow tube having first and second opposite ends;

a laser module assembly, including a laser diode and laser diode operating circuitry, secured within and adjacent said first end of said housing;

a battery having positive and negative terminals, said battery secured within said housing between said first and second ends of said housing; and a stylus module assembly, including a stylus tip, secured within and adjacent said second end of said housing such that said stylus tip extends outwardly from said housing wherein said stylus and laser pointer combination fits and is stored in the groove on the personal digital assistant.

2. A slimline stylus and laser pointer combination as set forth in claim 1 wherein said stylus module assembly includes a tubular member, said stylus tip secured on one end of said tubular member; and a pen tip secured to the opposite end of said tubular member, said tubular member removably secured within said housing such that one of said stylus tip or pen tip extends outwardly therefrom.

3. A slimline stylus and laser pointer combination as set forth in claim 1 wherein said housing includes a laser housing section and a battery housing section, said battery housing section including at least one annular indentation extending inwardly into said housing;

a connector cap, said connector cap positioned on one end of said battery housing section and retaining said battery within said battery housing section, said connector cap further connecting said battery housing section to said laser housing section;

a switch positioned within said laser housing section between said laser module assembly and said battery, said switch connected to said positive terminal of said battery;

a stylus cap positioned on one end of said laser housing section to retain the laser module assembly and switch within said laser housing section;

a contact spring positioned within said battery housing section and seated on said annular indentation, said contact spring engaging said negative terminal of said battery; and said laser housing section and said battery housing section made of a conductive material and a portion of said laser diode operating circuitry engaging said laser housing section to complete a circuit such that current flows from said battery to said laser diode operating circuitry when said switch is activated.

4. A laser pointer and personal digital assistant combination comprising:

the personal digital assistant having a groove located thereon; and the laser pointer including a housing, said housing including a thin, elongated hollow tube having first and second opposite ends;

a laser module assembly, including a laser diode and laser diode operating circuitry, secured within and adjacent said first end of said housing;

a battery having positive and negative terminals, said battery secured within said housing between said first and second ends of said housing wherein said laser pointer fits and is stored in the groove on the personal digital assistant.

5. A laser pointer and personal digital assistant combination as set forth in claim 4 including a stylus module assembly, including a stylus tip, secured within and adjacent said second end of said housing such that said stylus tip extends outwardly from said housing.

6. A laser pointer and personal digital assistant combination as set forth in claim 5 wherein said stylus module assembly includes a tubular member, said stylus tip secured on one end of said tubular member; and a pen tip secured to the opposite end of said tubular member, said tubular member removably secured within said housing such that one of said stylus tip or pen tip extends outwardly therefrom.

* * * * *